United States Patent [19]

Loebel et al.

[11] 4,150,566
[45] Apr. 24, 1979

[54] TORQUE MEASURING DEVICE FOR GAS TURBINE ENGINES, ESPECIALLY TURBO JET ENGINES

[75] Inventors: Wolf Loebel, Germering; Robert Rütsch, Karlsfeld, both of Fed. Rep. of Germany

[73] Assignee: Motoren- und Turbinen-Union Munchen GmbH, Fed. Rep. of Germany

[21] Appl. No.: 857,694

[22] Filed: Dec. 5, 1977

[30] Foreign Application Priority Data

Dec. 3, 1976 [DE] Fed. Rep. of Germany ....... 2654863

[51] Int. Cl.$^2$ ............................................. G01L 3/10
[52] U.S. Cl. ................................................. 73/136 A
[58] Field of Search ..................................... 73/136 A

[56] References Cited

U.S. PATENT DOCUMENTS 2,766,617  10/1956  Tyler et al. ..................... 73/136 A

FOREIGN PATENT DOCUMENTS 617064  2/1949  United Kingdom ................. 13/136 A

*Primary Examiner*—Charles A. Ruehl
*Attorney, Agent, or Firm*—Craig & Antonelli

[57] ABSTRACT

Torque measuring devices are provided for measuring the torque being transmitted from a turbo jet engine to auxiliary assemblies such as aircraft air conditioning equipment, auxiliary electrical generator, special lifting devices and the like. The torque measuring device includes a plurality of hollow shafts which are rotatable about a common axis. A first of the shafts is drivingly connected with the engine while a second of the shafts is in driving engagement with an auxiliary assembly. A third elastically deformable shaft is drivingly interposed between the first and second shafts in such a manner that the amount of torque being transmitted results in a relative rotation of the first and second shafts, which relative rotation is detected by electro-magnetic sensors. A toothed arrangement is provided for directly coupling the first and second shafts in response to a predetermined torque which results in relative rotation of the first and second shafts to close a gap between the teeth at this last-mentioned gear tooth arrangement. The first shaft is also provided with an intentional rated breaking point to accommodate shearing thereof in response to excessive torque transfer, whereby the drive train between the turbo jet engine and the auxiliary equipment is interrupted.

13 Claims, 3 Drawing Figures

TORQUE MEASURING DEVICE FOR GAS TURBINE ENGINES, ESPECIALLY TURBO JET ENGINES

BACKGROUND AND SUMMARY OF THE INVENTION

The invention relates to a torque measuring device for gas turbine engine arrangements, especially gas turbine jet engines (turbo jet engines) for aircraft, where at least one gas turbine jet engine drives one or more supplementary assemblies (generators or the like) with an intermediate reduction or distributor gear.

Gas turbine engines, especially aircraft turbine jet engines, are many times coupled with supplementary power consumers. For example, auxiliary assemblies such as generators for production of current, additional compressors for ventilation of the cabin or for supply of special aircraft lifting devices or the like, are provided.

Depending upon flight conditions, there are quite different loads on the engine which must be detected and responded to in due time in order to avoid overload damage to the engine.

An overload on the engine makes itself known, among other things, by "compressor pumping" which for example can be offset by timely blowdown of compressor air parts, from one or more intermediate compressor stages of the engine. See. U.S. Pat. No. 3,898,799 for background information on such remedial measures.

There is a relatively great difference in engine loads due to driving of auxiliary assemblies for example between normal subsonic flight without afterburning, with unchanged initial setting of the supporting surfaces, and supersonic flight with afterburning and consequently with changed sweepback of the supporting surfaces.

If for example we work from an arrangement of two turbo jet engines per aircraft and conceivable failure of one of the two engines, then the circumstance that the functioning engine must now drive all auxiliary assemblies along will apply almost a double load on the functioning engine, if here we compare the mentioned flight missions in subsonic and supersonic flight.

In the framework of the problem that has been outlined above, the invention is concerned with providing a torque measuring device with which different load moments on the drive for the auxiliary assemblies, arising because of different flight missions and operating conditions, will be detected as rapidly as possible, in a relatively simple way.

In particularly preferred embodiments of the present invention, the torque measuring apparatus includes a first rotatable shaft drivingly engageable with the turbo jet engine, a second rotatable shaft in driving engagement with at least one auxiliary assembly, and a third rotatable shaft interposed between the first and second shafts for transmitting torque therebetween, the third shaft being elastically deformable in response to the magnitude of torque being transmitted so that a resultant relative rotation of the first and second shafts results corresponding to the torque applied. To facilitate detection and measuring of the torque, sensors are provided for detecting the relative rotative positions of said first and second shafts.

In particularly preferred embodiments of the invention the third shaft is continuously connected with each of the respective first and second shafts by interengaging toothed arrangements. According to a still further feature of a particularly preferred embodiment of the invention, a further toothed arrangement is provided for drivingly connecting the first and second shafts directly to one another in bypassing relationship to the third shaft. This last-mentioned toothed arrangement includes teeth at the respective first and second shafts which are circumferentially spaced from one another during normal torque loading operations, the same being interengageable only upon exceeding a predetermined torque limit as controlled by the elastically deformable third shaft. In this manner, the torque can be continuously monitored over the range from zero torque up to the predetermined torque loading where the third shaft is effectively twisted enough so that the direct engagement of the teeth at the first and second shafts results, during which time both the driving connection via the third shaft and the driving connection directly from the first to the second shaft takes place.

According to a still further advantageous feature of a particularly preferred embodiment of the invention, the first shaft is provided with an intentional breaking point, whereby, upon exceeding a predetermined critical excessive torque limit, the first shaft is severed, and the drive train between the engine and the auxiliary assemblies is interrupted. In a particular advantageous embodiment, the portion of the first shaft remaining after such a breakage, is bearingly supported for rotation about the first shaft by means of bearings interposed between the first and second shafts.

The torque measuring apparatus of the present invention offers many advantages. In view of the overlapping telescoping arrangement of the shafts which accommodate the transmittal of torque between the engine and the auxiliaries, a particularly compact construction is provided. Further, since the elastically deformable shaft is continuously drivingly engageable between the first and second shafts, and need not be shifted into and out of engagement, a very economical to manufacture device, with high reliability is obtained. With the construction of the present invention, the parts are easily individually exchangeable. The initial or null setting of the torque measuring device can be accommodated in a very simple manner by the provision of the electromagnetic sensor devices as being mounted in a turnable holder, a feature which obviates manufacturing tolerance problems that may arise due to the formation of the teeth in the shafts in the drive train of the torque measuring device. With the simple arrangement of the present invention, the measurement range for the torque can be precisely defined, with simple precalibration of the respective third shafts (elastically deformable shafts interconnecting the first and second shafts and allowing relative rotation thereof as a function of the torque applied).

The torque measuring devices of the present invention also exhibit functional capability in both directions of flow of force, as well as over a broad temperature range.

These and further objects, features and advantages of the present invention will become more obvious from the following description when taken in connection with the accompanying drawings which show for purposes of illustration only, a single embodiment in accordance with the present invention.

DETAILED DESCRIPTION OF THE DRAWINGS

Figure 1:
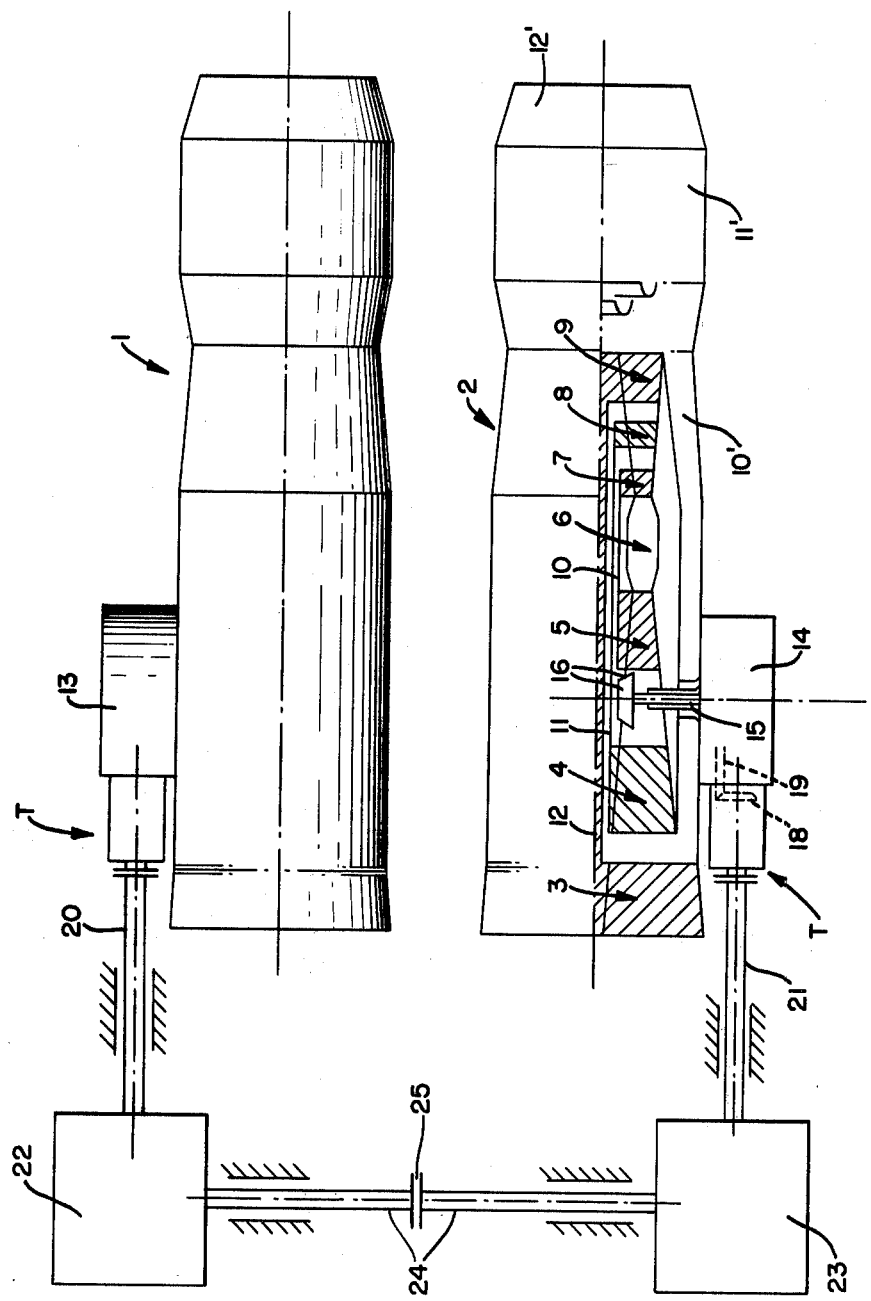
FIG. 1 is a schematic top view of two gas turbine jet drives with devices for power distribution to a plurality of auxiliary instruments, with association of the torque measuring device of the invention.

FIG. 1 schematically shows two gas turbine jet engines 1, 2 of an aircraft, which engines are similar to one another. For ease of illustration, only gas turbine jet engine 2 is shown, partly cut away along the mid-longitudinal axis. Like gas turbine jet engine 1, gas turbine jet engine 2 comprises, from left to right, a low pressure compressor 3, a medium pressure compressor 4, a high pressure compressor 5, an annular combustion chamber 6, a high pressure turbine 7, a medium pressure turbine 8 and a low pressure turbine 9. The high, medium and low pressure systems are interconnected by mechanically independent hollow shafts 10, 11, 12.

Low pressure compressor 3 supplies both the primary and secondary circuits (secondary flow conduit 10′) of the engine. An afterburner jet pipe and an adjusting thrust nozzle are indicated by numerals 11′ and 12′. Accordingly, gas turbine jet engines 1 and 2, constitute therefore a "three shaft, two flow engines". Since other manufacturing and operational details of such engine should be readily understood by one skilled in the art, given the state of the art and the present disclosure such details are dispensed with herein in order not to obfuscate what applicants consider as the present invention.

For the sake of simpler illustration, two instrument carriers normally disposed below the gas turbine jet drives are here shown folded into the plane of the drawing (FIG. 1) designated 13 and 14.

Each of these instrument carriers 13, 14 has among other things a distributor or reduction gear, connected via shaft 15 and a bevel gear 16 with hollow shaft 10 of the high pressure system, in positive force engagement.

Forward on instrument carrier 13, 14 there is flanged the torque measuring devices T, the details of which are discussed in detail with reference to FIGS. 2 and 3. The bevel gear 18 seated on the outermost first turning body 17 (FIG. 2) of this device engages a bevel gear 19 of the distributor or reduction gear, on the drive side.

Across the respective torque measuring devices then, the power taken from gas turbine jet engines 1, 2 will be used via drive shafts 20, 21, for driving two auxiliary instruments 22, 23 which can be mutually connected by another shaft 24, so that even with failure of one of the two engines 1, 2 and with appropriate actuation of a coupling 25 between the two halves of shaft 24, both auxiliary instruments 22, 23 can continue to be driven simultaneously.

Figure 2:
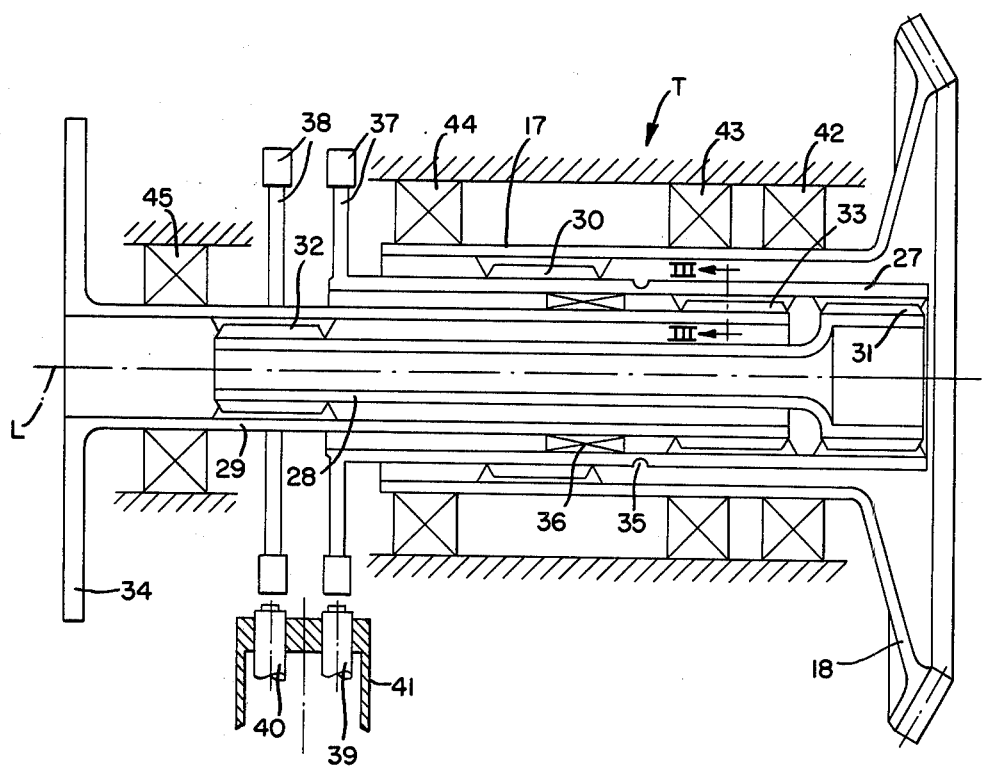
FIG. 2 is a mid-longitudinal section of a schematically illustrated torque measuring device of the invention.
Figure 3:
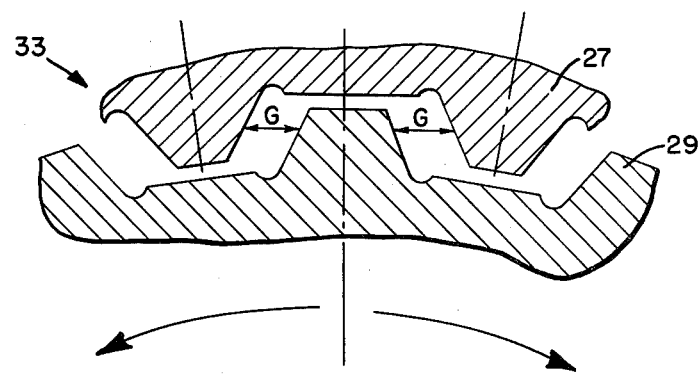
FIG. 3 is a detail on a larger sacle, according to a section view along line III—III of FIG. 2.

In the torque measuring device of FIG. 2 there are four rotatable hollow cylindrical shafts 17, 27, 28, 29 which are coaxial to common mid-longitudinal axis L of the device, said shafts, at least, in part, surrounding each other. Of these shafts, the innermost shaft 28 can be turned in a torque range corresponding to normal operation. Hereby, between the respective pairs of shafts 17, 27; 27, 28; 28, 29, there are engaging toothed arrangements 30, 31, 32 with which the torque that is to be determined in a normal situation can be transmitted from the outermost shaft 17 via the shaft 28 to the shaft 29 which is immediately adjacent to shaft 28, or vice versa. Another engaging tooth arrangement 33 is disposed between shafts 27, 29, and is so designed that it transmits an excessively higher torque by a shorter route, directy to the shaft 29 which is connected via a flange 34 with drive shaft 21 or 20 (FIG. 1). Referring to FIG. 3, the toothed arrangement 33 is constructed so that the respective teeth at shafts 27 and 29 are spaced by a circumferential gap G from one another when the device is in a no load condition. As the torque transfer between shafts 27 and 29, via shaft 28, increases, shaft 28 is elastically deformed or twisted slightly, the magnitude of the twist being a function of the magnitude of the torque applied, with a consequent relative rotative movement of shafts 27 and 29, and ultimately at a predetermined torque value, the closing of one of the gaps G. At this time, the toothed arrangement 33 drivingly connects the shafts 27 and 29 (one of the gaps G, dependent upon the direction of rotation of the shafts, will be closed so that the teeth interengage) with subsequent increases in torque being absorbed primarily by the toothed set 33 (although the toothed sets 31 and 32 will also continue to transfer that portion of the forces corresponding to the elastic deformation of the shaft 28 at that point). Accordingly, the sensors 39 and 40 will detect any relative rotation of the toothed plates 37 and 38, which relative rotation will be primarily during the lower torque loads prior to the engagement of the toothed set 33. Due to the relatively high rigidity connection via tooth connection 33, once made, additional relative rotation of the plates 37 and 38 will be relatively small.

The shaft 27 presents a rated breaking point 35 which, when the upper limit of the torque measuring range is exceeded, as defined sometime after intervention of toothed arrangement 33, allows shaft 27 to shear off more or less halfway. At this point, the one remaining driven end of the shaft 27 (left end as shown in FIG. 2), which is in engagement by toothed engaging arrangement 30, is rotatably supported by way of a bearing 36 interposed between shaft 27 and shaft 29, so that the same can still rotate without jamming the apparatus.

On the shaft 27 as well as on the shaft 29, there are two mutually parallel toothed plates 37, 38 of the same diameter and tooth count, whereof plate 38 fixed on shaft 29 is turned with reference to the other plate 37 when a moment in proportion to the torsion of shaft 28 is passed through. Both plates 37, 38 are associated without contact to electromagnetic sensors (receivers) 39, 40. Here the torque induced in the device is in proportion to the relative angle of torque of plates 37, 38 and also in proportion to the phase angle between the two pulse trains created by the magnetic receivers.

It is advantageous here that electromagnetic receivers 39, 40 be disposed in a holder 41 which can be turned so that a null point balance (phase angle=zero for torque=zero) can be obtained by a simple turning of holder 41. For this, magnetic receiver holder 41 is preferably arranged in such a way that it can be moved or stopped by means of a guide in a housing groove that is coaxial to mid-longitudinal axis L.

On the basis of like main dimensions but different wall thickness and material composition, the shaft 28 can be exchanged for a shaft that is modified with respect to these criteria and thereby the torque measurement range can be changed.

It is advantageous in the torque measuring device to have the tooth count of engaging devices 30, 31, 32, 33 so adjusted to the tooth count of the two plates 37, 38 that shafts 17, 27, 28, 29 can be assembled at any arbitrary position with reference to each other.

Numerals 42, 43, 44 and 45 of FIG. 1 designate other suitable roller bearings, which may be ball bearings or cylinder roller bearings for rotatably supporting shaft 17.

The phase angle signal produced by electromagnetic receivers 39, 40 with passage through a (given) moment when a specified torque measurement range is exceeded, can be utilized to control a compressor air blowdown device, as known for example from U.S. Pat. No. 3,898,799.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Torque measuring apparatus for measuring the torque being transmitted to auxiliary assemblies from a turbo jet engine or the like; said apparatus comprising:
    a first rotatable shaft drivingly engageable with an engine,
    a second rotatable shaft in driving engagement with at least one auxiliary assembly,
    a third rotatable shaft interposed between said first and second shafts for transmitting torque between said first and second shafts, said third rotatable shaft being elastically deformable in response to the magnitude of torque being transmitted between said first and second shafts with a resultant relative rotation of said first and second shafts,
    and detecting means for detecting the relative rotation of said first and second shafts,
    wherein said third shaft is in continuous driving engagement with said first shaft by means of a first toothed arrangement at said third and first shafts,
    wherein said third shaft is in continuous driving engagement with said second shaft by means of a second toothed arrangement at said third and second shafts, wherein said first and second toothed arrangements are spaced axially from one another on said third shaft,
    wherein said first, second, and third shafts are coaxial with one another, and further comprising a third toothed arrangement for drivingly connecting said first and second shafts in bypassing relationship to said third shaft, said third toothed arrangement including respective teeth at said first and second shafts that are spaced circumferentially from one another out of driving contact when the torque being transmitted is below a predetermined value, the consequent relative rotation of said first and second shafts during transmission of torques above said predetermined value causing driving connection of said third toothed arrangement.

2. Apparatus according to claim 1, wherein a fourth rotatable shaft is provided, said fourth shaft being coaxial with said other shafts and being continuously drivingly engageable between said engine and said first shaft, by means of a fourth toothed arrangement at said first and fourth shafts.

3. Apparatus according to claim 2, wherein said first shaft has a rated breaking point such that said first shaft breaks, interrupting the drive train between said first and second shafts, in response to a predetermined high critical torque transmission.

4. Apparatus according to claim 3, wherein a bearing is provided for rotatably supporting a driven portion of said first shaft on the periphery of said second shaft when said first shaft breaks.

5. Apparatus according to claim 4, wherein said detecting means includes no contact electromagnetic sensors which sense the respective rotative position of said first and second shafts.

6. Apparatus according to claim 2, wherein each of said first and second shafts include respective parallel toothed plates of like diameter and tooth count, said electromagnetic sensors detecting differences in rotative position of said toothed plates.

7. Apparatus according to claim 6, wherein the tooth count of each of the first through fourth toothed arrangements and of the toothed plates is such as to accommodate assembly of the first through fourth shafts in any arbitrary rotary position with respect to one another.

8. Apparatus according to claim 2, wherein said fourth shaft is a hollow shaft which partially surrounds said first shaft, and wherein said first shaft is a hollow shaft which partially surrounds said second shaft and said third shaft.

9. Apparatus according to claim 4, wherein said detecting means includes no contact electromagnetic sensors which sense the respective rotative position of said first and second shafts.

10. Apparatus according to claim 9, wherein each of said first and second shafts include respective parallel toothed plates of like diameter and tooth count, said electromagnetic sensors detecting differences in rotative position of said toothed plates.

11. Apparatus according to claim 9, wherein said electro-magnetic sensors are disposed in a rotatable holder.

12. Apparatus according to claim 1, further comprising a plurality of turbo jet engines in driving engagement with common auxiliary assemblies, one each of said torque measuring apparatus being interposed between said common auxiliary assemblies and respective ones of said engines.

13. Apparatus according to claim 1, wherein a plurality of interchangeable third shafts are provided, each third shaft having a different elastic deformation characteristic for enabling different torque detection characteristics to be achieved by substituting a third shaft having specified elastic deformation characteristics due to its composition and wall thickness for a third shaft having other elastic deformation characteristics due to its composition and wall thickness.

* * * * *